US007861951B2

(12) United States Patent
Juo

(10) Patent No.: US 7,861,951 B2
(45) Date of Patent: Jan. 4, 2011

(54) LIQUID STORAGE CONTAINER FOR A PAINTING DEVICE

(75) Inventor: Chung-Tsuen Juo, Taichung (TW)

(73) Assignee: Victor Air Tools Co., Ltd., Wurih Township (TW)

( * ) Notice: Subject to any disclaimer, the term of this patent is extended or adjusted under 35 U.S.C. 154(b) by 33 days.

(21) Appl. No.: 12/488,669

(22) Filed: Jun. 22, 2009

(65) Prior Publication Data

US 2010/0243758 A1 Sep. 30, 2010

(30) Foreign Application Priority Data

Mar. 27, 2009 (TW) .............................. 98110216 A

(51) Int. Cl.
*B05B 7/30* (2006.01)
*B05B 9/03* (2006.01)
*F16L 37/28* (2006.01)

(52) U.S. Cl. ....................... 239/354; 239/302; 239/345; 251/149.4; 251/149.6

(58) Field of Classification Search ................. 239/302, 239/340–342, 344, 345, 354, 379, 525, 526, 239/DIG. 14; 251/149, 149.1, 19.4, 149.64
See application file for complete search history.

(56) References Cited

U.S. PATENT DOCUMENTS

| | | | | |
|---|---|---|---|---|
| 5,975,164 | A * | 11/1999 | Whaley et al. | 141/351 |
| 2004/0016823 | A1 * | 1/2004 | Kitajima | 239/302 |
| 2005/0103893 | A1 * | 5/2005 | Birrenkott et al. | 239/345 |
| 2006/0255178 | A1 * | 11/2006 | Juo | 239/288 |

* cited by examiner

*Primary Examiner*—Darren W Gorman
(74) *Attorney, Agent, or Firm*—Wang Law Frim; Li K. Wang

(57) ABSTRACT

A liquid storage container for a painting device includes a container for storing paint. The container is connected with a lid by screw fastening. The top of the lid has a connecting part with a hole. A flow guide element extends from below the hole. The glow guide element has a channel in fluid communications with the hole. The other end of the channel has a first glow guide in fluid communication with the inside of the container. A steel ball is disposed in the upper portion of the channel with one side urging against the surrounding of the hole. The other side of the steel ball is urged by a spring. The other end of the spring urges against the bottom of the channel.

9 Claims, 9 Drawing Sheets

LIQUID STORAGE CONTAINER FOR A PAINTING DEVICE

BACKGROUND OF THE INVENTION

1. Field of Invention

The invention relates to a liquid storage container for a painting device and, in particular, to a liquid storage container that conveniently supplies paint to a painting device.

2. Related Art

FIGS. 7 and 8 show a common liquid storage container 71 containing some paint 72. A lid (now shown) is on top of it. To use it, one opens the lid and tilt the liquid storage container 72 so that the paint 72 is poured into the liquid storage tank 741 above the paint pen 74.

However, if the user is not careful in refilling the container, the liquid paint is likely to pour outside the liquid storage tank 741. When a painting job is finished and the liquid storage tank 741 still has some leftover paint, one often needs to pour the paint 72 in the liquid storage tank 741 of the paint pen 74 back into the liquid storage container 71. In this case, one has to align carefully with the opening of the liquid storage container 71, which is very time-consuming. If the paint is carelessly spilt, it is a waste and cause troubles in cleaning.

To overcome the above-mentioned inconvenience of refilling the liquid storage tank with paint, there is another type of paint liquid storage container (not shown), whose top has a small nozzle. The nozzle has a lid. The user can conveniently refill the liquid storage tank with paint by removing the lid. However, in this case, one still needs to carefully pour the leftover paint from the liquid storage tank back to the liquid storage container. Therefore, such a design still cannot completely solve the problems in the aforementioned liquid storage container 71.

Of course, the liquid storage container 71 supplying paint to the paint pen 74 can also supply paint to a nozzle 75 for large-area painting. As shown in FIG. 9, there is a larger liquid storage bucket 751 above the nozzle 75. The liquid storage bucket 751 has a lid 752. The user can open the lid 752 to refill the liquid storage bucket 751 with paint.

Nevertheless, after the paint job is finished, the user still has to open the lid 752 in order to pour the leftover paint back to an external larger liquid storage bucket (not shown). In addition to time-consuming, this method also has the problems of possible spills and cleaning.

SUMMARY OF THE INVENTION

An objective of the invention is to solve the above-mentioned problems and provides a liquid storage container for a painting device. The invention is container that stores paint and has the feature of easy paint flows. When the container is combined with a paint pen or nozzle, it can quickly supply the paint. After the paint job is finished, the container can be directly removed from the paint pen or nozzle, without the need of pouring. That is, the invention has the advantages of easy paint refill and no paint waste.

To achieve the above-mentioned objective, the invention includes: a container, a connecting part, a ball, and a spring.

The container has a liquid storage space. The connecting part protrudes from the container. The top and bottom of the connecting part have a hole and a first flow guide, respectively. The connecting part is further provided with a channel connecting the hole and the first flow guide. The channel is further in fluid communications with the liquid storage space.

The ball is disposed above the channel, with one side limited and urged against the hole. The spring is disposed in the channel, with one end urging against the bottom of the channel and the other end urging against the other side of the ball.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
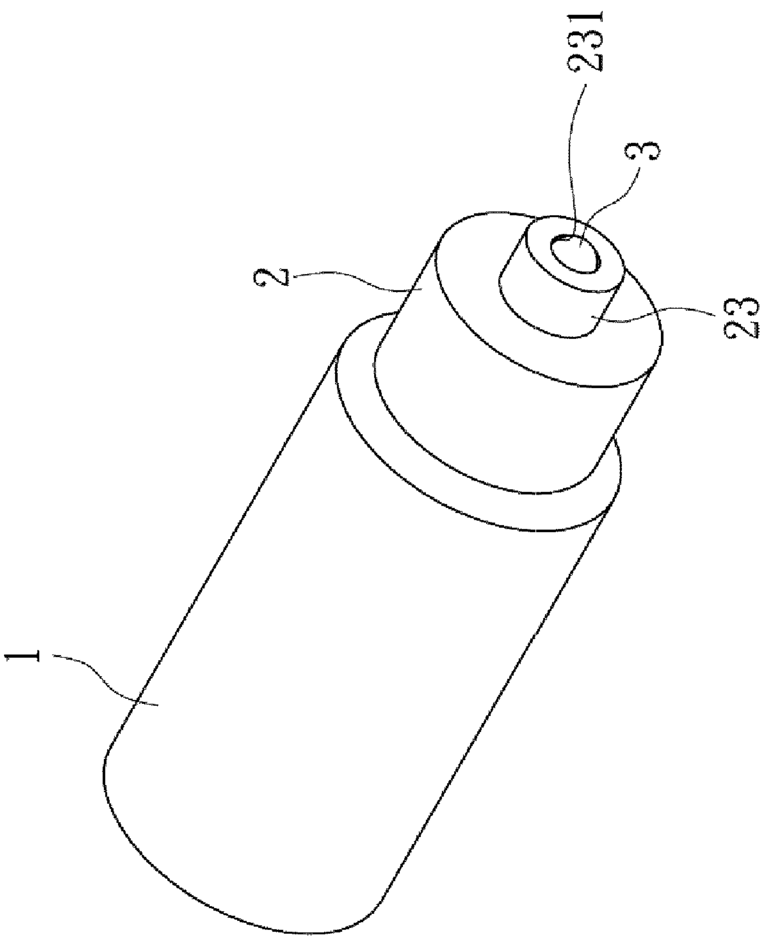
FIG. 1 is a three-dimensional view of the invention.
Figure 2:
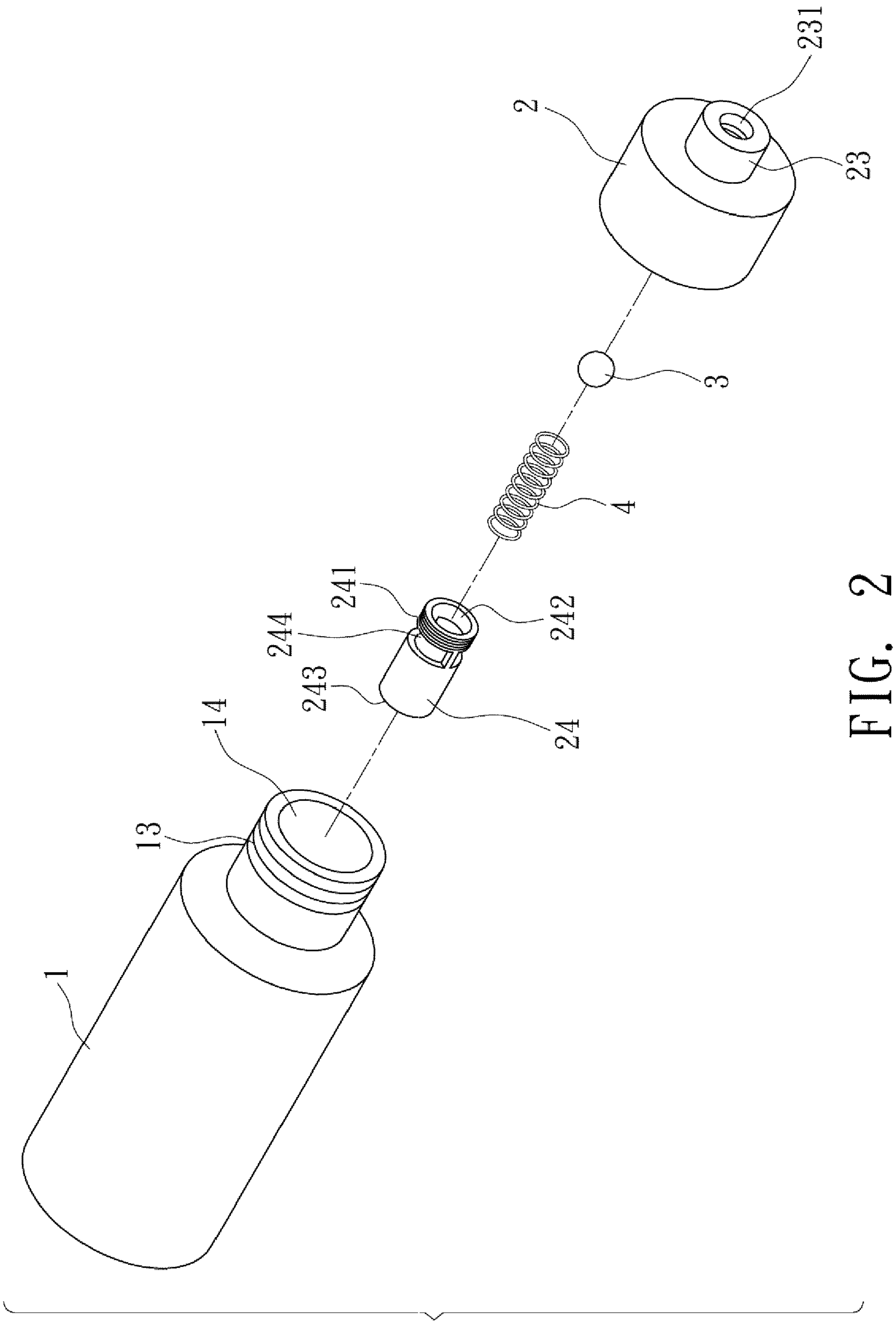
FIG. 2 is a three-dimensional exploded view of the invention.
Figure 3:
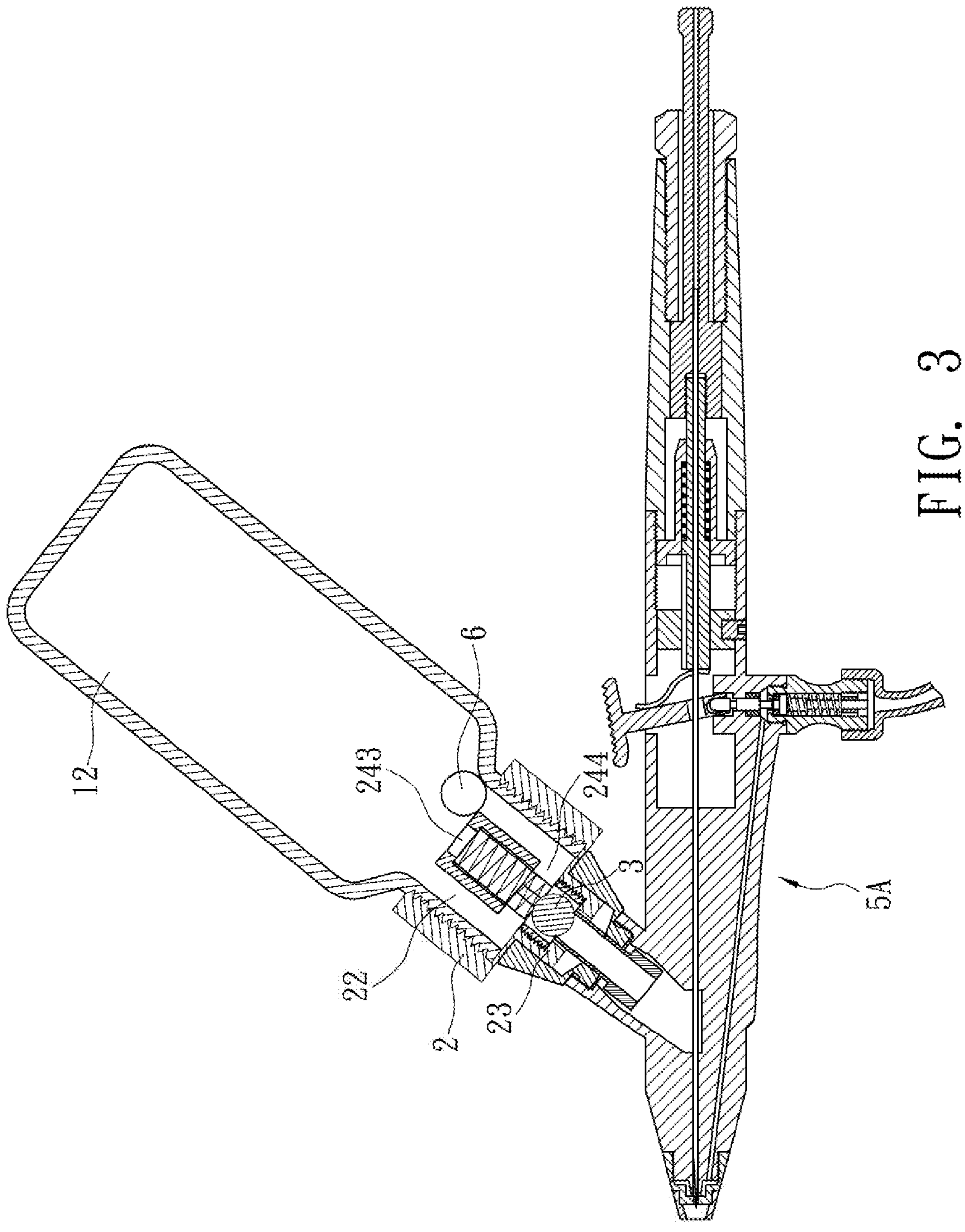
FIG. 3 is a cross-sectional view of the disclosed liquid storage container with a paint pen.

The present invention will be apparent from the following detailed description, which proceeds with reference to the accompanying drawings, wherein the same references relate to the same elements.

Please refer to FIGS. 1 to 5. In the following description, there are two orientations, the liquid storage container in its rest position and in use. The explanation uses the embodiment of using the disclosed liquid storage container on a painting device. The invention includes: a container 1, a connecting part 23, a ball 3, and a spring 4.

The container 1 has a liquid storage space 12 for holding paint 11. The top of the container 1 has a first combining part. In this embodiment, the first combining part is an outer thread part 13. Moreover, the first combining part is formed with an opening 14.

The connecting part 23 protrudes from the top of the container 1. The top and bottom of the connecting part 23 have a hole 231 and a first flow guide 243, respectively. The connecting part 23 is further formed with a channel 242 connecting the hole 231 and the first flow guide 242. The channel 242 is also in fluid communications with the liquid storage space 12. In this embodiment, the top of the container 1 has a lid 2. The bottom of the lid 2 has a second combining part corresponding to the first combining part. In this embodiment, the second combining part is an inner thread part 21 that matches with the outer thread part 13, thereby connecting the container 1 and the lid 2. The bottom of the lid 2 is formed inward with a flowing space 22 corresponding to the first combining part.

Moreover, the connecting part 23 protrudes from the top of the lid 2. A flow guide element 24 extends from below the hole 231 of the connecting part 23 to the flowing space 22. The channel 242 is formed by penetrating thorough the top and bottom of the flow guide element 24. In this embodiment, the inner wall of the connecting part 23 under the hole 231 is formed with an inner thread section 232. The outer edge at the top of the flow guide element 24 is formed with an outer thread section 241. The inner and outer thread sections 232, 241 match with each other for the connection of the flow guide element 24 and the connecting part 23 of the lid 2.

Besides, the flow guide element 24 is formed with a second flow guide 244 far from the first flow guide 243. In this embodiment, there are two symmetrically formed second flow guides to enhance the liquidity of paint.

The ball 3 is disposed in the upper portion of the channel 242. Its diameter is greater than the diameter of the hole 231. One side of the ball 3 is thus limited and can urge against the surrounding of the hole 231 or back off when it is depressed by some external object. In this embodiment, the ball 3 is a steel ball. The ball being limited mentioned above means that the ball 3 can perform a reciprocal motion within a specific range when it is urged.

The spring 4 is disposed in the channel 242, with one end urging against the bottom of the channel 242 and the other end urging against the other side of the ball 3. In this embodiment, the spring 4 is a compressible spring.

Figure 4:
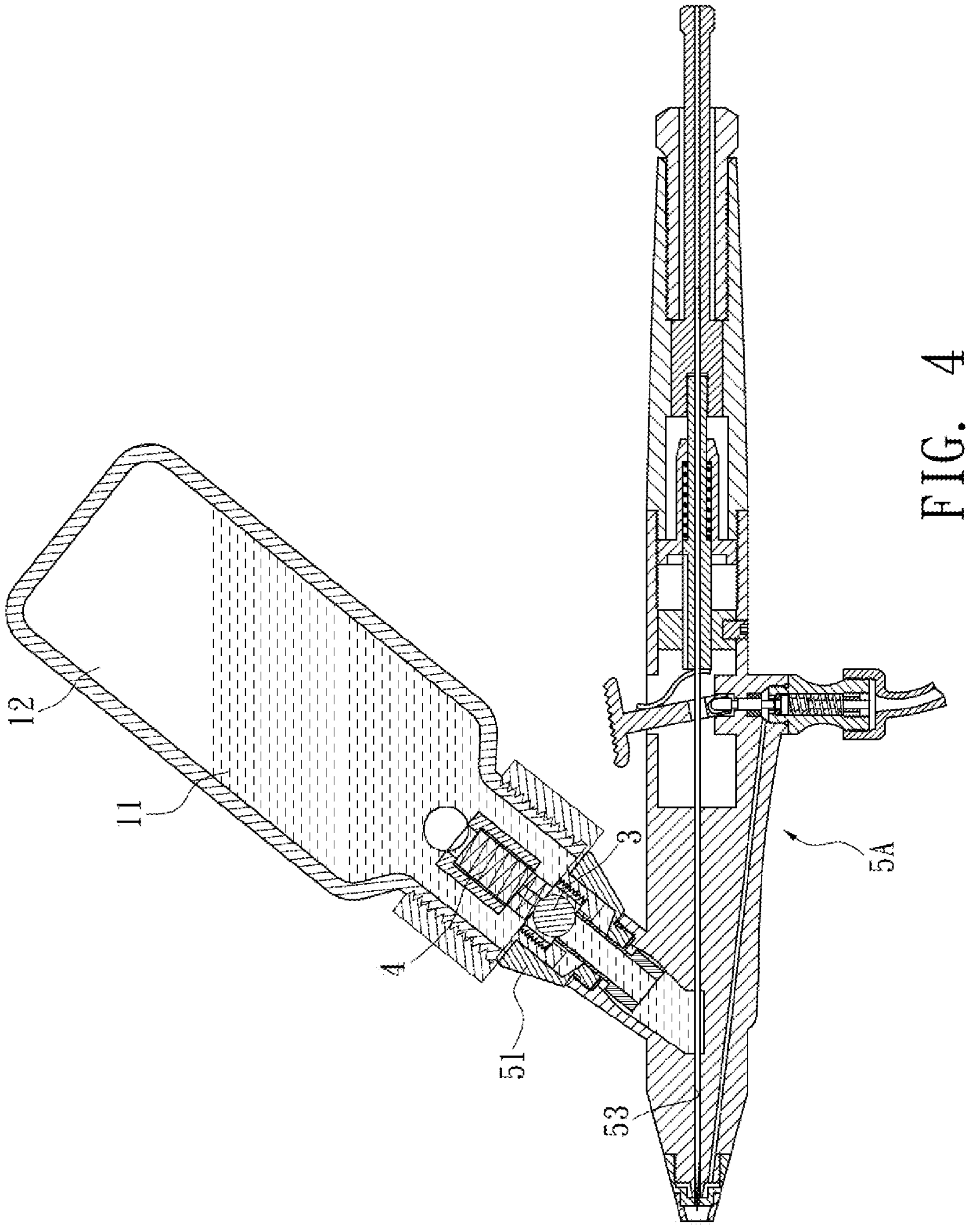
FIG. 4 is a schematic view when the container in FIG. 3 is filled with paint.
Figure 5:
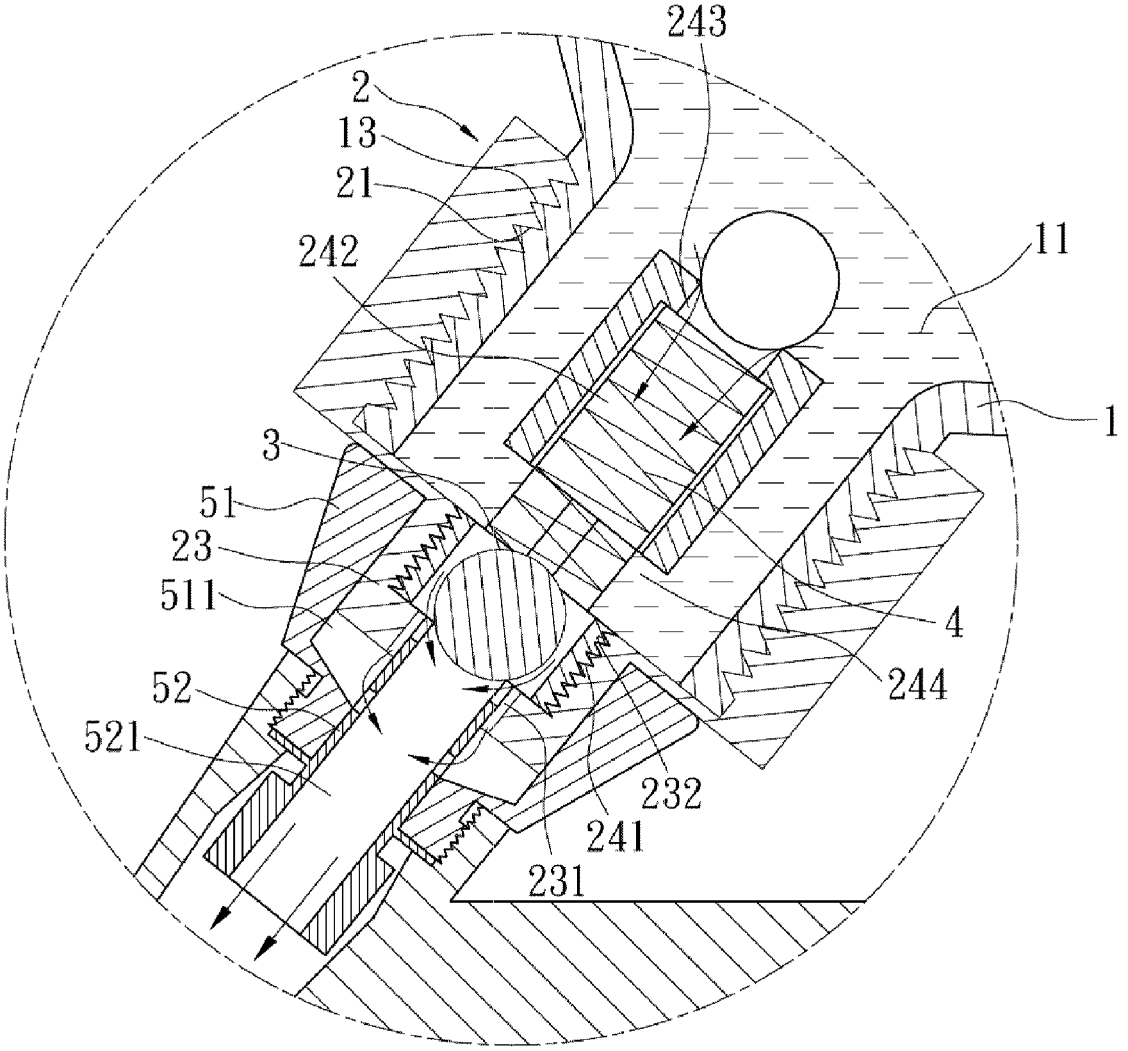
FIG. 5 is an enlarged view of the lid in FIG. 4.
Figure 6:
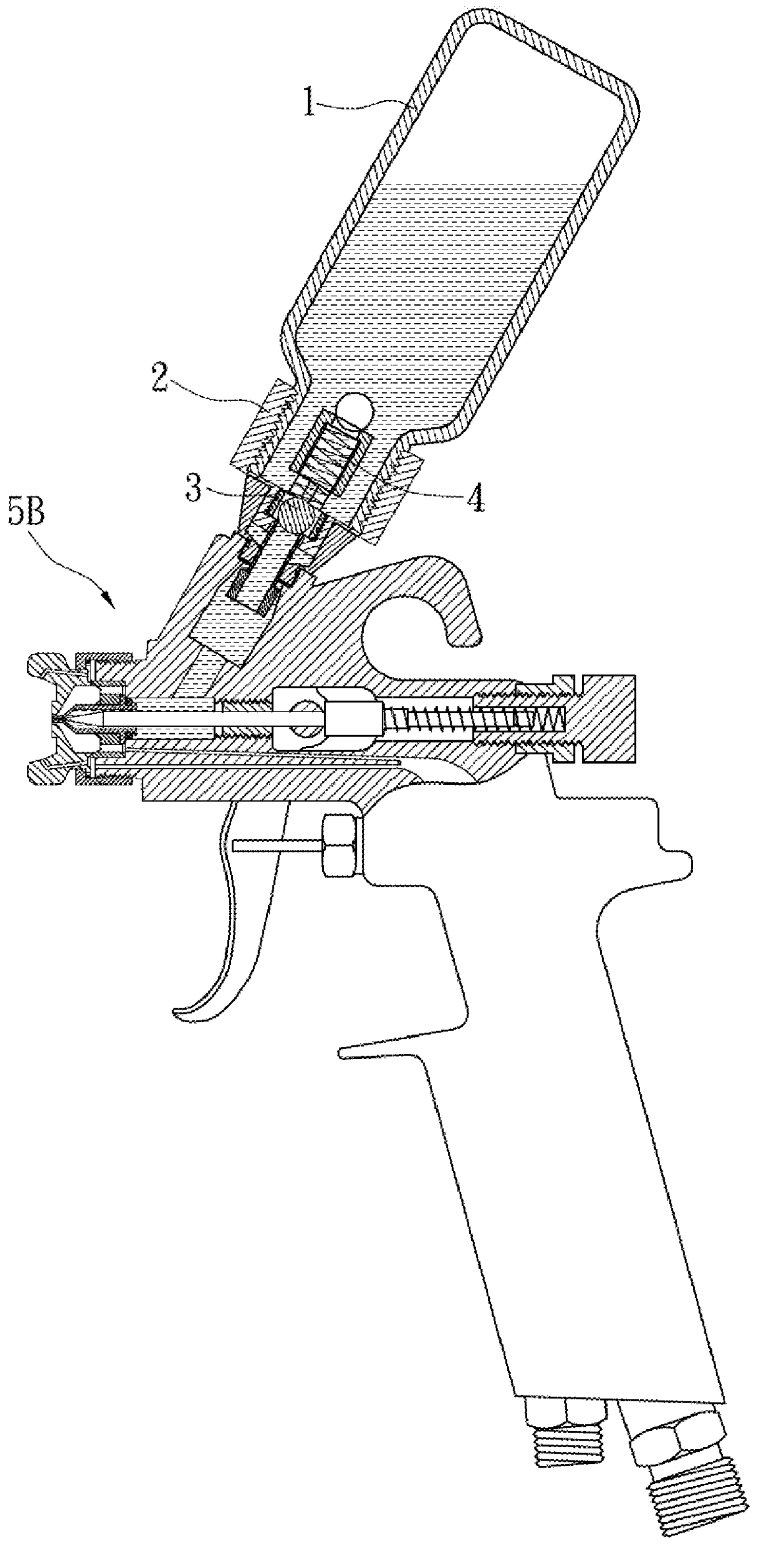
FIG. 6 is a cross-sectional view of part of the liquid storage container with a nozzle.
Figure 7:
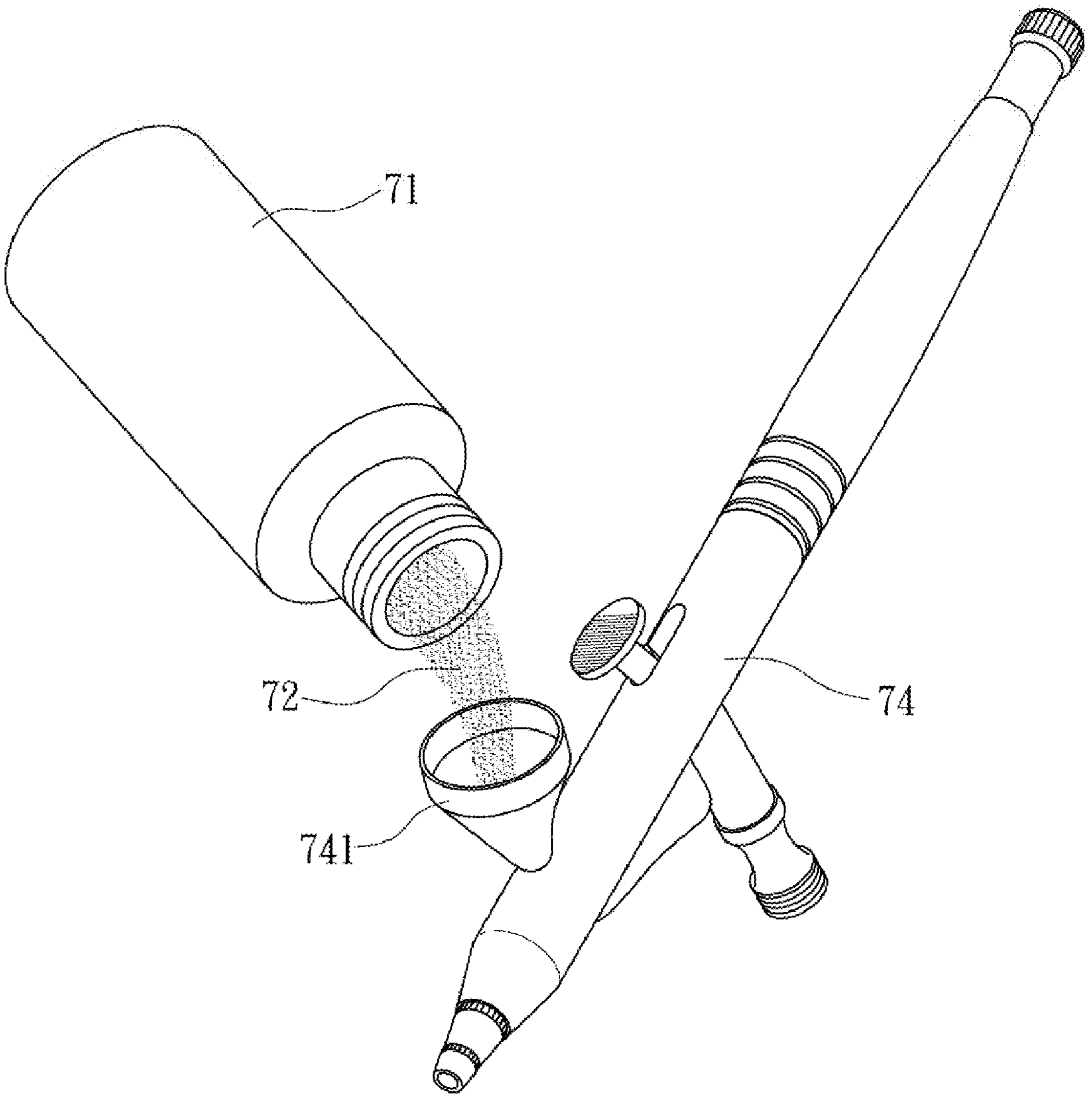
FIG. 7 PRIOR ART
FIG. 7 is a schematic view of refilling a conventional liquid storage container.
Figure 8:
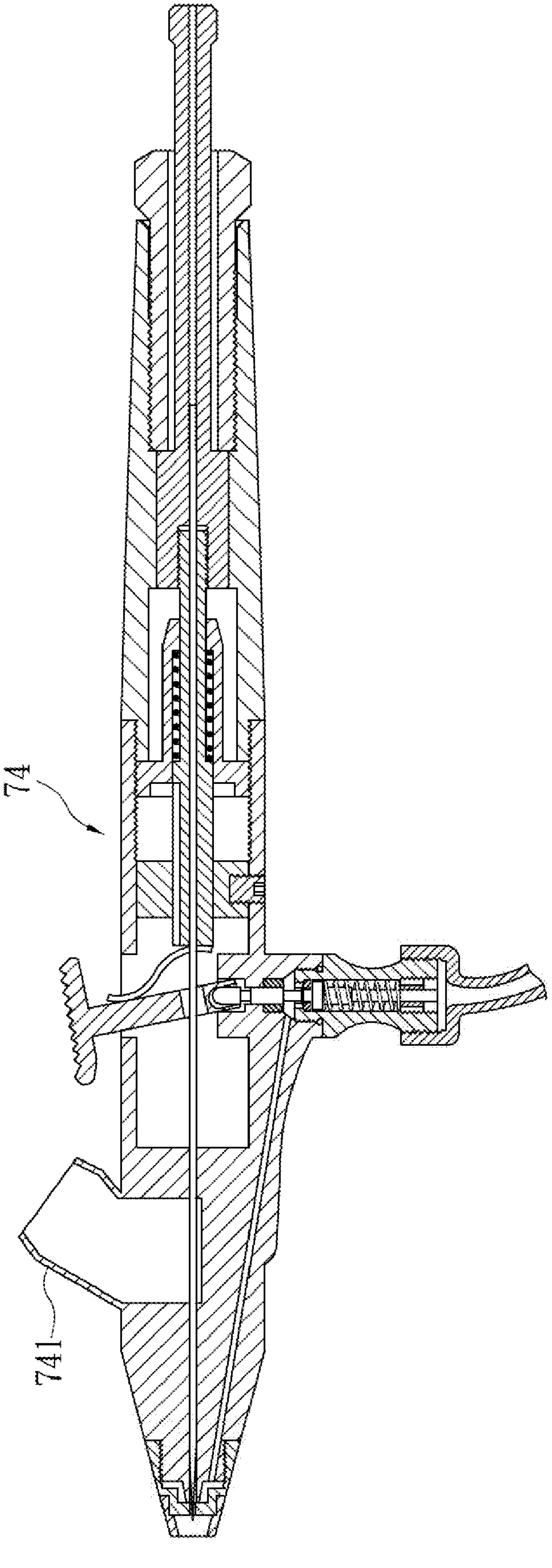
FIG. 8 PRIOR ART
FIG. 8 is a cross-sectional view of a conventional paint pen.
Figure 9:
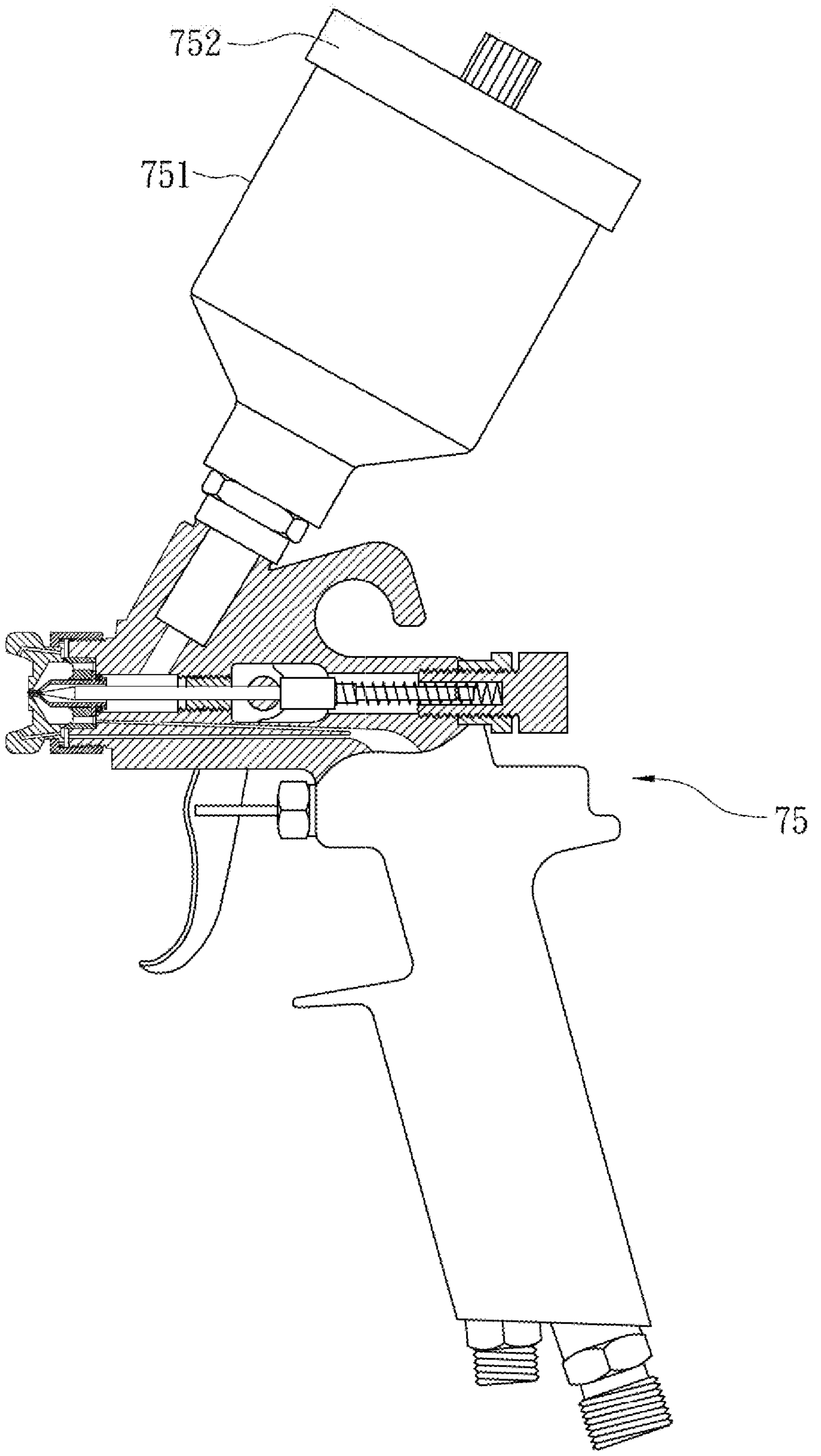
FIG. 9 PRIOR ART
FIG. 9 is a cross-sectional view of a conventional nozzle.

Please refer to FIGS. 4 and 5. During a paint job, the liquid storage container is connected with a painting device (e.g., the paint pen 5A). The painting device has a material filling structure 51 with a filling tank 511. The liquid storage container tightly connects to the filling tank 511 via the connecting part 23 of the lid 2. In this embodiment, such a connection is achieved by engaging. Of course, the painting device can be selectively a paint pen 5A or a nozzle 5B. The liquid storage container with a paint pen 5A is shown in FIG. 4. The liquid storage container with a nozzle 5B is shown in FIG. 6.

When the liquid storage container tightly engages with the filling tank 511 using the connecting part 23 of the lid, the ball 3 (e.g., steel ball) at the hole 231 of the lid 2 is pushed by a pushing element 52 in the material filling structure 51. The ball 3 thus moves inward for the paint 11 in the container 1 to enter.

As a result, the paint 11 flows via the first flow guide 243 or the second flow guide 244 into the channel 242. It then enters the filling tank 511 via the hole 231. Or it directly flows into the a material filling pipe 521 in the pushing element 52, and then into the material filling channel 53 inside the paint pen 5A for painting. Besides, since the liquid storage container and the paint pen 5A are connected by tight engagement, no paint will be spilt as it flows into the filling tank 511.

In addition, a steel ball 6 is usually disposed inside the container. When the paint inside the container precipitates, the user can shake the steel ball to make the paint more homogeneous. If the steel ball 6 happens to urge against the first flow guide 243, the paint in the container can also flow out via the second flow guide 244.

As shown in FIG. 6, which is a schematic view of the liquid storage container with a nozzle 5B. Since the paint flowing scheme is the same as the above-mentioned case with a paint pen, it is not further described herein.

After the paint job is finished, the user can directly remove the liquid storage container from the paint pen 5A or nozzle 5B. In this case, the ball 3 (e.g., the steel ball) is no longer pushed inward. It is then urged by the spring 4 to close the hole 231 of the connecting part 23. The paint 11 inside the container 1 thus cannot flow out.

When recycling the paint, one can slightly invert the paint pen 5A or nozzle 5B, so that the paint therein flows back to the container 1 under gravity, before unplugging the container 1. This is very convenient and quick. Most important of all, it does not make the environment dirty as in the prior art and does not have the problem of wasting paint.

In summary, the invention provides a liquid storage container that can quickly filling the paint pen or nozzle with paint and can be directly removed without the need of pouring the paint back into the container. Therefore, painting filling is quick and convenient. No paint is wasted when unplugging the container. Moreover, the paint will not be spilled to pollute the environment.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A liquid storage container for a painting device, comprising:

a container having a liquid storage space;

a connecting part protruding from a top of the container, the connecting part having a top and a bottom, wherein the top of the connecting part has a hole and the bottom of the connecting part has a first flow guide, the connecting part further defining a channel fluidly connecting the hole and the first flow guide, wherein the channel is also in fluid communication with the liquid storage space;

a ball, which is in an upper portion of the channel, wherein a one side of the ball is urged against the hole and the ball has limited reciprocal motion within the channel; and a spring, which is disposed in the channel, with one end of the spring urging against a bottom of the channel and another end opposite the one end of the spring urging against a side of the ball which is opposite the one side.

2. The liquid storage container for a painting device of claim 1, wherein the top of the container has a first combining part with an opening and the top of the container further has a lid having a bottom with a second combining part corresponding to the first combining part, wherein the bottom of the lid is recessed to form a flowing space, and wherein the connecting part extends from a top of the lid, and a flow guide element extends from below the hole to the flowing space, and the channel is defined through a top portion and a bottom portion of the flow guide element.

3. The liquid storage container for a painting device of claim 2, wherein the first combining part is an outer thread part and the second combining part is an inner thread part, the inner and outer thread parts matching with each other so that the container and the lid are connected.

4. The liquid storage container for a painting device of claim 2, wherein an inner wall of the connecting part below the hole has an inner thread section, and an outer edge at the top portion of the flow guide element has an outer thread section, and the inner and outer thread sections match with each other so that the flow guide element and the lid are connected.

5. The liquid storage container for a painting device of claim 2, wherein the flow guide element defines a second flow guide longitudinally spaced apart from the first flow guide.

6. The liquid storage container for a painting device of claim 2, wherein the liquid storage container is connected to a painting device with a filling structure, the filling structure has a filling tank, and the liquid storage container is tightly connected to the filling tank via the connecting part of the lid.

7. The liquid storage container for a painting device of claim 2, wherein the painting device is a paint pen or nozzle.

8. The liquid storage container for a painting device of claim 2, wherein the ball is a steel ball.

9. The liquid storage container for a painting device of claim 1, wherein the spring is a compressible spring.

* * * * *